US009000684B2

(12) United States Patent
Zhang et al.

(10) Patent No.: US 9,000,684 B2
(45) **Date of Patent: *Apr. 7, 2015**

(54) LED CONTROLLER WITH COMPENSATION FOR DIE-TO-DIE VARIATION AND TEMPERATURE DRIFT

(71) Applicant: Marvell World Trade Ltd., St. Michael (BB)

(72) Inventors: Wanfeng Zhang, Palo Alto, CA (US); Radu Pitigoi-Aron, San Jose, CA (US)

(73) Assignee: Marvell World Trade Ltd., St, Michael (BB)

( * ) Notice: Subject to any disclaimer, the term of this patent is extended or adjusted under 35 U.S.C. 154(b) by 38 days.

This patent is subject to a terminal disclaimer.

(21) Appl. No.: 13/895,786

(22) Filed: May 16, 2013

(65) Prior Publication Data

US 2013/0249419 A1 Sep. 26, 2013

Related U.S. Application Data

(63) Continuation of application No. 13/078,568, filed on Apr. 1, 2011, now Pat. No. 8,446,108.

(60) Provisional application No. 61/320,643, filed on Apr. 2, 2010, provisional application No. 61/323,272, filed on Apr. 12, 2010.

(51) Int. Cl.

*G05F 1/00* (2006.01)
*G06F 3/038* (2013.01)
*H05B 33/08* (2006.01)

(52) U.S. Cl.

CPC ........ *H05B 33/0851* (2013.01); *H05B 33/0854* (2013.01)

(58) Field of Classification Search

CPC ........... H05B 33/0833; H05B 33/0863; H05B 33/0845; H05B 33/0809; H05B 33/0812; H05B 33/0815; H05B 33/0824; H05B 33/0842; H05B 37/02; G09G 2320/0285; G09G 2320/0693; G09G 3/3406; G09G 2320/0233

USPC ................ 315/117, 118, 291, 297, 300, 302, 315/307–309; 345/55, 82, 87, 214

See application file for complete search history.

(56) References Cited

U.S. PATENT DOCUMENTS 7,414,370 B2 8/2008 Kunjappan
7,471,287 B2 12/2008 Chen et al.

(Continued)

FOREIGN PATENT DOCUMENTS

JP 2006266749 A 10/2006
JP 2007234577 A 9/2007

(Continued)

OTHER PUBLICATIONS

Datasheet R6436™; Product Description and Application; Material Specifications; INTEMATRIX, Fremont, CA; 1 page.

(Continued)

*Primary Examiner* — Vibol Tan

(57) ABSTRACT

A system including a selection module to select one of a plurality of templates corresponding to a plurality of light emitting diodes, where the selected template includes one or more of temperature, current, and voltage characteristics of the plurality of light emitting diodes. A control module measures a voltage across one of the plurality of light emitting diodes; determines a temperature of the plurality of light emitting diodes based on the voltage measured across the one of the plurality of light emitting diodes and the selected template; and in order to maintain a luminosity of the plurality of light emitting diodes at a predetermined luminosity, adjusts current through the plurality of light emitting diodes based on the temperature, the selected template, and calibration data. The calibration data include current through the plurality of light emitting diodes and corresponding luminosities of the plurality of light emitting diodes.

20 Claims, 10 Drawing Sheets

(56) References Cited

U.S. PATENT DOCUMENTS

| | | | | |
|---|---|---|---|---|
| 7,502,038 | B2 * | 3/2009 | Yasuda et al. | 345/690 |
| 7,999,491 | B2 | 8/2011 | Peng et al. | |
| 8,076,872 | B2 | 12/2011 | Sauerlander et al. | |
| 8,258,709 | B2 | 9/2012 | Moskowitz | |
| 8,264,448 | B2 | 9/2012 | Shteynberg et al. | |
| 8,704,456 | B2 * | 4/2014 | Shteynberg et al. | 315/291 |
| 8,710,754 | B2 * | 4/2014 | Baddela et al. | 315/192 |
| 2005/0030192 | A1 | 2/2005 | Weaver et al. | |
| 2006/0202915 | A1 | 9/2006 | Chikugawa | |
| 2006/0220571 | A1 | 10/2006 | Howell et al. | |
| 2006/0273331 | A1 | 12/2006 | Lim et al. | |
| 2007/0200513 | A1 | 8/2007 | Ha et al. | |
| 2008/0111079 | A1 | 5/2008 | Stein et al. | |
| 2008/0111673 | A1 | 5/2008 | Roberts | |
| 2008/0122832 | A1 | 5/2008 | Chen et al. | |
| 2010/0141178 | A1 | 6/2010 | Negrete et al. | |
| 2010/0283322 | A1 | 11/2010 | Wibben | |
| 2012/0212151 | A1 | 8/2012 | Chu | |

FOREIGN PATENT DOCUMENTS

| | | | |
|---|---|---|---|
| JP | 2009525617 | A | 7/2009 |
| JP | 2009205843 | A | 9/2009 |
| WO | WO-2006043232 | A1 | 4/2006 |
| WO | WO-2008041152 | A2 | 4/2008 |
| WO | WO-2008041153 | A1 | 4/2008 |
| WO | WO-2010103480 | A2 | 9/2010 |

OTHER PUBLICATIONS

Datasheet G1758™; Product Description and Application; Material Specifications; INTEMATRIX, Fremont, CA; 1 page.

PCT International Search Report for Internatioanl Application No. PCT/US2012/051610; Nov. 22, 2012; 4 pages.

PCT International Search Report for PCT International Application No. PCT/US2011/1030971; Nov. 23, 2011; 8 pages.

Japanese Notice of Reasons for Rejection for Japanese Application No. 2013-502895 dated Dec. 16, 2014; 2 Pages. No English Translation provided.

* cited by examiner

| Temp | If | Vf | RLF | | PWR | Rlux/W | RelPWR |
|---|---|---|---|---|---|---|---|
| [C] | [mA] | [V] | F/F25 | | [W] | ref @ 25C | ref @ 25C |
| | | | | | | | |
| -20 | 350 | 4 | 1.15 | | 1.40 | 0.82 | 0.92 |
| 25 | 350 | 3.8 | 1 | | 1.33 | 0.75 | 1.00 |
| 80 | 350 | 3.62 | 0.85 | | 1.27 | 0.67 | 1.12 |

FIG. 5

LED CONTROLLER WITH COMPENSATION FOR DIE-TO-DIE VARIATION AND TEMPERATURE DRIFT

CROSS-REFERENCE TO RELATED APPLICATIONS

This is a continuation of U.S. patent Ser. No. 13/078,568, filed on Apr. 1, 2011, which claims the benefit of U.S. Provisional Application No. 61/320,643, filed on Apr. 2, 2010 and U.S. Provisional Application No. 61/323,272, filed on Apr. 12, 2010. The entire disclosures of the above applications are incorporated herein by reference.

FIELD

The present disclosure relates generally to LED-based displays and more particularly to LED controllers with compensation for die-to-die variation and temperature drift in LEDs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A PN junction of a light emitting diode (LED) emits light when the PN junction is forward-biased. Generally, LEDs are energy-efficient, reliable, low-maintenance, and environmentally friendly. Accordingly, LED-based displays (luminaires) are used in a variety of residential and commercial applications. For example, the displays are used in microwave ovens, advertizing signs, industrial control panels, street lights, and so on.

Luminosity of LEDs is typically a function of a forward current through the PN junction when the PN junction is forward-biased. Additionally, the luminosity is a function of a temperature of the PN junction (junction temperature). A forward voltage applied across the PN junction determines the forward current through the PN junction. The forward voltage is also a function of the junction temperature.

Referring now to FIGS. 1-5, various characteristics of LEDs are shown. While the characteristics of LEDs manufactured by different manufacturers may vary slightly, the characteristics generally have similar templates. In FIG. 1, a graph of relative luminous flux ($\phi_v/\phi_{v(350\ mA)}$) of an LED is shown as a function of forward current $I_F$ of the LED at a predetermined ambient temperature (e.g., $T_A$=25° C.). As shown, at a predetermined ambient temperature $T_A$, the relative luminous flux increases approximately linearly as the forward current $I_F$ increases.

In FIG. 2, a graph of a forward current $I_F$ of an LED is shown as a function of a forward voltage $V_F$ of the LED at a predetermined ambient temperature (e.g., $T_A$=25° C.). As shown, at a predetermined ambient temperature $T_A$, the forward current $I_F$ increases as the forward voltage $V_F$ increases.

In FIG. 3, a graph of a relative forward voltage ($\Delta V_F = V_F - V_{F(25^\circ\ C.)}$) of an LED is shown as a function of a junction temperature $T_j$ of the LED at a predetermined forward current $I_F$ (e.g., 350 mA). As shown, the relative forward voltage $\Delta V_F$ to maintain a predetermined forward current $I_F$ decreases as the junction temperature $T_j$ increases.

In FIG. 4, a graph of a relative luminous flux ($\phi_v/\phi_{v(25^\circ\ C.)}$) of an LED is shown as a function of a junction temperature $T_j$ at a predetermined forward current $I_F$ (e.g., 350 mA). As shown, at a predetermined forward current $I_F$, the relative luminous flux decreases approximately linearly as the junction temperature $T_j$ increases.

In FIG. 5, a table shows variations in forward voltage $V_F$ and relative luminous flux (RLF) of an LED over a wide temperature range (e.g., from −20° C. to 80° C.) at a predetermined forward current $I_F$ (e.g., 350 mA). As shown, the power to maintain consistent luminosity increases as the temperature increases.

In summary, while the forward current $I_F$ determines the luminosity of the LEDs, the forward current $I_F$ and the forward voltage $V_F$ that determines the forward current $I_F$ depend on temperature (i.e., the junction temperature $T_j$ and the ambient temperature $T_A$). Accordingly, the luminosity of the LEDs can change when the junction temperature $T_j$ and the ambient temperature $T_A$ change. Specifically, at a predetermined forward current $I_F$ (or forward voltage $V_F$), the luminosity decreases as the temperatures increase.

Additionally, due to die-to-die variations during manufacture, LEDs may exhibit different $I_F/V_F$ characteristics. Further, the LEDs may exhibit different luminosities for the same forward current $I_F$. Consequently, the light output of the LEDs may vary at the same temperature or within a temperature range. While variations in the light output may be tolerable in some applications, the variations may be unacceptable in commercial applications.

SUMMARY

A system comprises a calibration module, a selection module, and a control module. The calibration module is configured to generate calibration data for a plurality of light emitting diodes (LEDs). The calibration data include current through the LEDs and corresponding luminosities of the LEDs. The selection module is configured to select one of a plurality of templates corresponding to the LEDs. The selected template includes at least one of temperature, current, and voltage characteristics of the LEDs. The control module is configured to determine a temperature of the LEDs and adjust current through the LEDs based on the temperature, the selected template, and the calibration data to maintain a luminosity of the LEDs at a predetermined luminosity.

In other features, the system further comprises a diode in thermal proximity to the LEDs and a proportional to absolute temperature (PTAT) module configured to determine a junction temperature of the diode using a PTAT procedure. The PTAT procedure includes determining a difference in forward voltage drop across the diode at two different forward currents having a known ratio. The control module is configured to determine the temperature of the LEDs based on the junction temperature of the diode.

In another feature, the control module is configured to measure a voltage across one of the LEDs and determine the temperature of the LEDs based on the voltage and the selected template.

In another feature, the LEDs are connected in series between a first node that communicates with a supply voltage and a second node. The control module is configured to measure a first voltage across the first node and the second node, determine a second voltage across one of the LEDs based on the first voltage and a number of the LEDs, and determine the temperature of the LEDs based on the second voltage and the selected template.

In another feature, the calibration module is configured to generate the calibration data at one or more predetermined temperatures and store the calibration data in a nonvolatile memory.

In another feature, the plurality of templates is stored in a lookup table, and each of the plurality of templates corresponds to a different type of LED.

In another feature, the selection module is in communication with a pair of resistances and is configured to select the selected template from the lookup table based on values of the resistances.

In other features, the system further comprises a switch mode power supply configured to supply power to the LEDs. The control module is configured to generate control signals to drive the switch mode power supply and adjust the current through the LEDs by adjusting at least one of a switching frequency of the control signals and a pulse width of the control signals.

In another feature, an integrated circuit comprising the system.

In another feature, a display system comprises the system and the LEDs.

In still other features, a method comprises generating calibration data for a plurality of light emitting diodes (LEDs). The calibration data include current through the LEDs and corresponding luminosities of the LEDs. The method further comprises selecting one of a plurality of templates corresponding to the LEDs. The selected template includes at least one of temperature, current, and voltage characteristics of the LEDs. The method further comprises determining a temperature of the LEDs and adjusting current through the LEDs based on the temperature, the selected template, and the calibration data to maintain a luminosity of the LEDs at a predetermined luminosity.

In other features, the method further comprises arranging a diode in thermal proximity to the LEDs, determining a junction temperature of the diode using a proportional to absolute temperature (PTAT) procedure, and determining the temperature of the LEDs based on the junction temperature of the diode. The PTAT procedure includes determining a difference in forward voltage drop across the diode at two different forward currents having a known ratio.

In other features, the method further comprises measuring a voltage across one of the LEDs and determining the temperature of the LEDs based on the voltage and the selected template.

In other features, the method further comprises connecting the LEDs in series between a first node communicating with a supply voltage and a second node, measuring a first voltage across the first node and the second node, determining a second voltage across one of the LEDs based on the first voltage and a number of the LEDs, and determining the temperature of the LEDs based on the second voltage and the selected template.

In other features, the method further comprises generating the calibration data at one or more predetermined temperatures and storing the calibration data in a nonvolatile memory.

In another feature, the method further comprises storing the plurality of templates in a lookup table, where each of the plurality of templates corresponds to a different type of LED.

In other features, the method further comprises supplying power to the LEDs using a switch mode power supply, generating control signals to drive the switch mode power supply, and adjusting the current through the LEDs by adjusting at least one of a switching frequency of the control signals and a pulse width of the control signals.

In another feature, the method further comprises implementing the method in an integrated circuit comprising the LEDs.

In still other features, a system comprises a calibration module and a control module. The calibration module is configured to generate first calibration data for a first set of light emitting diodes (LEDs). The first calibration data include amounts by which a first current through the first set of LEDs is to be adjusted when a temperature of a luminaire that includes the first set of LEDs changes within a predetermined range. The control module is configured to adjust the first current through the first set of LEDs based on the first calibration data and the temperature of the luminaire when the temperature of the luminaire is within the predetermined range. The adjusted first current maintains luminosity of the first set of LEDs at a first predetermined luminosity.

In other features, the calibration module is configured to generate second calibration data for a second set of LEDs. The second calibration data include amounts by which a second current through the second set of LEDs is to be adjusted when the temperature of the luminaire that includes the second set of LEDs changes within the predetermined range. The control module is configured to adjust the second current through the second set of LEDs based on the second calibration data and the temperature of the luminaire when the temperature of the luminaire changes within the predetermined range. The adjusted second current maintains luminosity of the second set of LEDs at a second predetermined luminosity.

In another feature, the control module is configured to adjust the second current independently of the first current.

In other features, the system further comprises a diode in thermal proximity to the first set of LEDs and the second set of LEDs and a proportional to absolute temperature (PTAT) module configured to determine a junction temperature of the diode using a PTAT procedure. The PTAT procedure includes determining a difference in forward voltage drop across the diode at two different forward currents having a known ratio. The control module is configured to determine the temperature of the luminaire based on the junction temperature of the diode.

In other features, the control module is configured to measure a voltage across an LED in the first set of LEDs, and determine the temperature of the luminaire based on the voltage and a template corresponding to the first set of LEDs. The template includes at least one of temperature, current, and voltage characteristics of the first set of LEDs.

In other features, LEDs in the first set of LEDs are connected in series between (i) a first node communicating with a supply voltage and (ii) a second node. The control module is configured to measure a first voltage across the first node and the second node, determine a second voltage across an LED in the first set of the LEDs based on the first voltage and a number of the LEDs, and determine the temperature of the LEDs based on the second voltage and a template corresponding to the first set of LEDs. The template includes at least one of temperature, current, and voltage characteristics of the first set of LEDs.

In other features, the system further comprises a switch mode power supply configured to supply power to the first set of LEDs. The control module is configured to generate control signals to drive the switch mode power supply, and adjust the first current through the first set of LEDs by adjusting at least one of a switching frequency of the control signals and a pulse width of the control signals.

In another feature, an integrated circuit comprises the system.

In another feature, a display system comprises the system and the first set of LEDs.

In still other features, a system comprises a calibration module and a control module. The calibration module is configured to generate first calibration data and second calibration data for a first set of light emitting diodes (LEDs) and a second set of LEDs of a luminaire, respectively. The first calibration data and the second calibration data include amounts by which a first current through the first set of LEDs and a second current through the second set of LEDs are to be adjusted when a temperature of the luminaire changes within a predetermined range. The control module is configured to adjust (i) the first current based on the first calibration data and the temperature of the luminaire and (ii) the second current based on the second calibration data and the temperature of the luminaire when the temperature of the luminaire is within the predetermined range. The adjusted first current and the adjusted second current maintain luminosities of the first set of LEDs and the second set of LEDs at a first predetermined luminosity and a second predetermined luminosity, respectively. The control module is configured to adjust the second current independently of the first current.

In still other features, a method comprises generating first calibration data for a first set of light emitting diodes (LEDs). The first calibration data include amounts by which a first current through the first set of LEDs is to be adjusted when a temperature of a luminaire that includes the first set of LEDs changes within a predetermined range. The method further comprises adjusting the first current through the first set of LEDs based on the first calibration data and the temperature of the luminaire when the temperature of the luminaire is within the predetermined range. The adjusted first current maintains luminosity of the first set of LEDs at a first predetermined luminosity.

In other features, the method further comprises generating second calibration data for a second set of LEDs. The second calibration data include amounts by which a second current through the second set of LEDs is to be adjusted when the temperature of the luminaire that includes the second set of LEDs changes within the predetermined range. The method further comprises adjusting the second current through the second set of LEDs based on the second calibration data and the temperature of the luminaire when the temperature of the luminaire changes within the predetermined range. The adjusted second current maintains luminosity of the second set of LEDs at a second predetermined luminosity.

In another feature, the method further comprises adjusting the second current independently of the first current.

In other features, the method further comprises arranging a diode in thermal proximity to the first set of LEDs and the second set of LEDs and determining a junction temperature of the diode using a proportional to absolute temperature (PTAT) procedure. The PTAT procedure includes determining a difference in forward voltage drop across the diode at two different forward currents having a known ratio. The method further comprises determining the temperature of the luminaire based on the junction temperature of the diode.

In other features, the method further comprises measuring a voltage across an LED in the first set of LEDs and determining the temperature of the luminaire based on the voltage and a template corresponding to the first set of LEDs. The template includes at least one of temperature, current, and voltage characteristics of the first set of LEDs.

In other features, the method further comprises connecting LEDs in the first set of LEDs in series between (i) a first node communicating with a supply voltage and (ii) a second node, measuring a first voltage across the first node and the second node, determining a second voltage across an LED in the first set of the LEDs based on the first voltage and a number of the LEDs, and determining the temperature of the LEDs based on the second voltage and a template corresponding to the first set of LEDs. The template includes at least one of temperature, current, and voltage characteristics of the first set of LEDs.

In other features, the method further comprises supplying power to the first set of LEDs using a switch mode power supply, generating control signals to drive the switch mode power supply, and adjusting the first current through the first set of LEDs by adjusting at least one of a switching frequency of the control signals and a pulse width of the control signals.

In still other features, a system comprises a sensor and a control module. The sensor is configured to sense luminosity of a luminaire. The luminaire includes a first set of light emitting diodes (LEDs) and a second set of LEDs. The control module is configured to generate a first voltage generated based on the sensed luminosity, compare the first voltage to a reference voltage, and adjust at least one of a first current and a second current through the first set of LEDs and the second set of LEDs, respectively, to equalize the first voltage and the reference voltage.

In another feature, the control module is configured to maintain a predetermined ratio of the first current to the second current.

In another feature, the control module is configured to adjust the first current and the second current by a predetermined amount.

In another feature, the control module is configured to adjust the first current independently of the second current.

In another feature, the control module is configured to select a ratio of variation in the first current to variation in the second current, and adjust the second current based on variation in the first current and the ratio.

In another feature, the control module is configured to select a range within which the first current and the second current is to be adjusted, divide the range into a sub-ranges, select ratios of variation in the first current to variation in the second current for the sub-ranges, respectively, and adjust the second current based on (i) variation in the first current and (ii) one of the ratios corresponding to one of the sub-ranges in which the first current or the second current lies.

In another feature, the system further comprises a switch mode power supply configured to supply power to the first set of LEDs and the second set of LEDs. The control module is configured to generate control signals to drive the switch mode power supply, and adjust the first current and the second current through the first set of LEDs and the second set of LEDs, respectively, by adjusting at least one of a switching frequency of the control signals and a pulse width of the control signals.

In another feature, an integrated circuit comprises the system.

In another feature, a display system comprises the system, the first set of LEDs, and the second set of LEDs.

In still other features, a method comprises sensing luminosity of a luminaire. The luminaire includes a first set of light emitting diodes (LEDs) and a second set of LEDs. The method further comprises generating a first voltage generated based on the sensed luminosity, comparing the first voltage to a reference voltage, and adjusting at least one of a first current and a second current through the first set of LEDs and the second set of LEDs, respectively, to equalize the first voltage and the reference voltage.

In another feature, the method further comprises maintaining a predetermined ratio of the first current to the second current.

In another feature, the method further comprises adjusting the first current and the second current by a predetermined amount.

In another feature, the method further comprises adjusting the first current independently of the second current.

In another feature, the method further comprises selecting a ratio of variation in the first current to variation in the second current and adjusting the second current based on variation in the first current and the ratio.

In another feature, the method further comprises selecting a range within which the first current and the second current is to be adjusted, dividing the range into a sub-ranges, selecting ratios of variation in the first current to variation in the second current for the sub-ranges, respectively, and adjusting the second current based on (i) variation in the first current and (ii) one of the ratios corresponding to one of the sub-ranges in which the first current or the second current lies.

In another feature, the method further comprises supplying power to the first set of LEDs and the second set of LEDs using a switch mode power supply, generating control signals to drive the switch mode power supply and adjusting the first current and the second current through the first set of LEDs and the second set of LEDs, respectively, by adjusting at least one of a switching frequency of the control signals and a pulse width of the control signals.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 5 is a table showing variations in forward voltage $V_F$ and relative luminous flux of an LED over a temperature range at a predetermined forward current $I_F$;

DESCRIPTION

Figure 1:
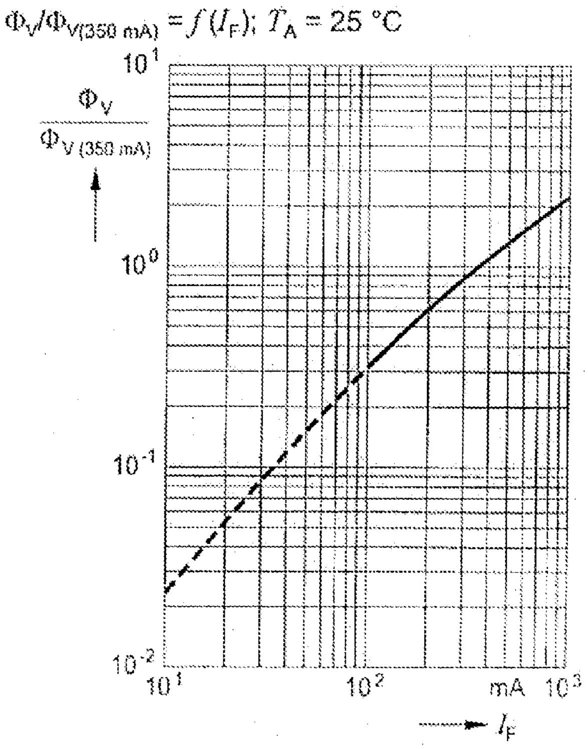
FIG. 1 is a graph of relative luminous flux of an LED as a function of forward current $I_F$ of the LED at a predetermined ambient temperature.
Figure 2:
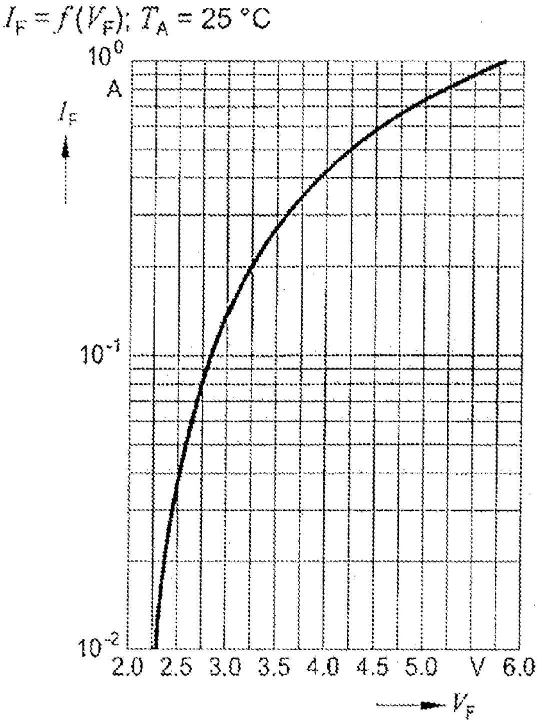
FIG. 2 is a graph of a forward current $I_F$ of an LED as a function of a forward voltage $V_F$ of the LED at a predetermined ambient temperature.
Figure 3:
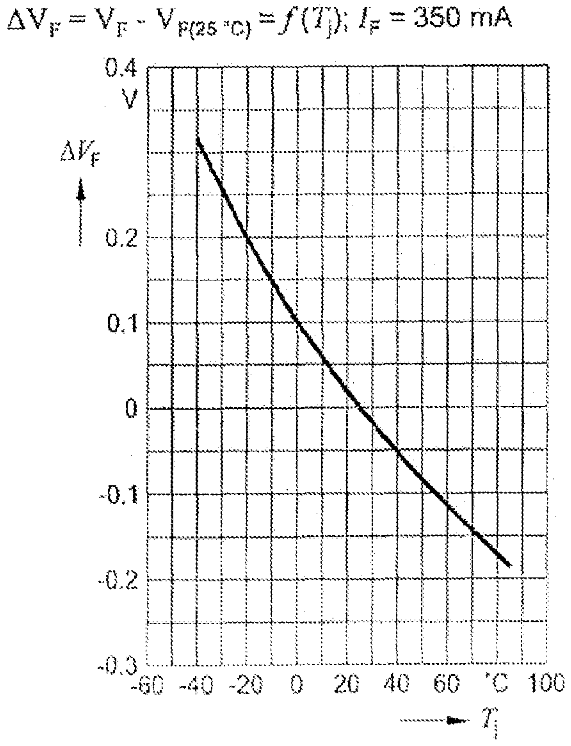
FIG. 3 is a graph of a relative forward voltage ($\Delta V_F$) of an LED as a function of a junction temperature $T_j$ of the LED at a predetermined forward current $I_F$.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

To achieve consistent luminosity, manufacturers of LED-based displays typically select LEDs having close group parameters. Further, during normal operation, to preserve consistency of light output over a temperature range, the manufacturers use different solutions. For example, light sensors can be used in a closed feedback loop to sense variations in light output, and forward current can be adjusted to nullify the variations. These solutions, however, increase cost of the displays.

The present disclosure relates to LED controllers that generate and store calibration data when LED displays are manufactured. During normal operation, the LED controllers use the calibration data to compensate drift in luminosity due to die-to-die-variations and temperature variations. An overview of the calibration and compensation performed by the LED controllers follows.

The LED controllers drive the LEDs with a predetermined forward current. If the junction temperature of the LEDs is determined, the forward current through the LEDs can be adjusted to maintain the light output of the LEDs despite changes in the junction temperature.

At a predetermined forward current, the forward voltage of an LED depends on the junction temperature. Accordingly, if the forward voltage is measured, the junction temperature can be determined based on the forward voltage using characteristics of the LED. Based on the temperature, the calibration data provides an amount by which the forward current should be adjusted to maintain consistent luminosity.

During assembly and testing of a luminaire, an LED controller of the luminaire generates and stores calibration data for the LEDs used in the luminaire. The calibration data is stored in a nonvolatile memory in the LED controller of the luminaire. Examples of nonvolatile memory include a One Time Programmable (OTP) memory and an erasable programmable read-only memory (EPROM). The calibration and compensation can be performed using different methods, each having different precision and complexity.

Figure 4:
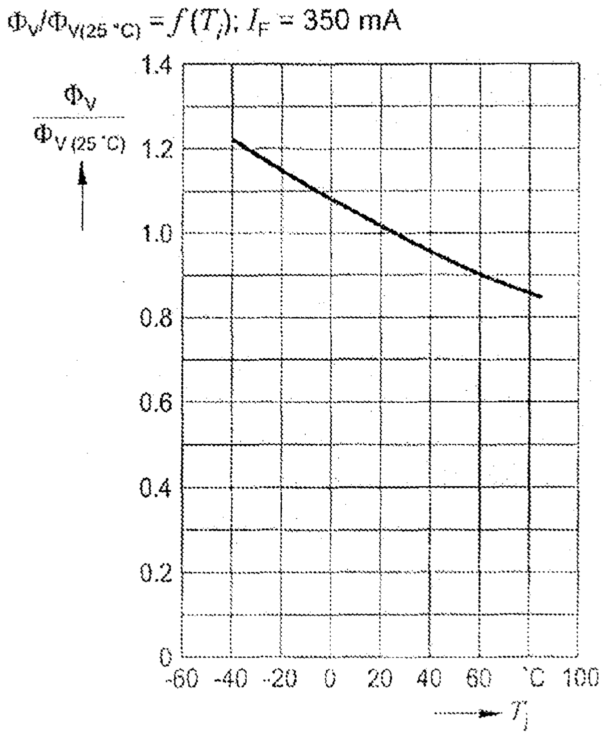
FIG. 4 is graph of a relative luminous flux of an LED as a function of a junction temperature $T_j$ at a predetermined forward current $I_F$.

In a first method, calibration is performed at only one reference temperature (e.g., 25° C.) during assembly and testing of the luminaire. Variations in forward voltage and luminosity due to changes in temperature are generally similar for a family of LEDs. The term family as used herein denotes a brand or type of LED manufactured by an LED manufacturer. The variations in forward voltage and luminosity (e.g., temperature characteristics shown in FIG. 4) for different families of LEDs are stored as templates in Lookup Tables (LUTs) in the LED controller. The manufacturer can select a template corresponding to the family of LEDs used in the luminaire.

During normal operation, the LED controller measures a forward voltage of the LEDs. Based on the measured forward voltage, the LED controller determines the temperature from the template stored in the lookup table. Based on the temperature, the LED controller adjusts the forward current to maintain a consistent light output according to the calibration data stored in the LED controller.

Another method of determining the temperature includes placing a small signal silicon diode at a location where the temperature is to be measured. The small signal silicon diode is used as a temperature sensor together with a proportional to absolute temperature (PTAT) module to determine the temperature as described below.

In a second method, calibration is performed at a plurality of reference temperatures (e.g., at 25° C., 0° C., and 85° C.) during assembly and testing of the luminaire. Using the second method, the LED controller can compensate for temperature drift more precisely than the first method.

In a third method, calibration is performed to compensate only die-to-die variations at a predetermined temperature. The predetermined temperature is typically selected from an operating temperature range of the luminaire. Since only die-to-die variations are compensated, this method allows using LEDs having large tolerances, which reduces the cost of the luminaires.

Preferably, the die-to-die calibration is always performed. Thereafter, the temperature drift can be compensated by measuring the temperature using one of the methods indicated above.

In some implementations, the LED controller may drive multiple strings of LEDs. For example, an implementation may include two strings of LEDs. A first string may drive essentially white LEDs. A second string may drive red LEDs. The above methods can be used for multiple strings. Further, the above methods can be used for color compensation when a level of one light (e.g., red in the above example) could change the hue of the luminaire. Additionally, the above methods are particularly useful when dimming control is used since human eye is more sensitive to variations in light output at lower luminosities than at higher luminosities.

Further, the above methods can be implemented with different topologies of switch mode power supply (SMPS) typically used to supply power to the LEDs. For example, the SMPS may include a buck SMPS, a boost SMPS, a flyback SMPS, etc. Additionally, the SMPS may operate in different modes (e.g., continuous, discontinuous, or mixed mode).

Mathematically, a relationship between the forward current $I_F$ and the forward voltage $V_F$ of an LED can be linearized over an operating temperature range of the luminaire. For example, the relationship between the forward current $I_F$ and the forward voltage $V_F$ of an LED can be expressed by the equation $I_F=A*V_F+B$, where A and B are constants. The equation provides a locus for having a constant luminous flux across the operating temperature range of the luminaire. Values of the constants A and B can be determined from the calibration data. Thereafter, differential luminous flux of the LED can be calculated based on the temperature of the LEDs in the luminaire.

For example, for the operating temperature of the luminaire, the values of the constants A and B can be derived from the following characteristics provided by the manufacturer of the LED: luminous flux versus forward current at a constant temperature, luminous flux versus temperature at a constant forward current, forward voltage versus temperature at a constant forward current and forward current versus forward voltage at a constant temperature.

The forward current at an operating temperature of the luminaire can be calculated by measuring the forward voltage at the operating temperature. On supplying the calculated forward current, the forward voltage is measured again to ensure that the above equation is satisfied at the operating temperature of the luminaire. By supplying forward current that satisfies the equation at the operating temperature of the luminaire, the luminosity of the luminaire is maintained at the operating temperature.

The characteristics depicted in FIGS. 1-4 show that the luminous flux is dependent of the forward current, forward voltage, and temperature. Furthermore, these three variables (forward current, forward voltage, and temperature) are not independent. Consequently, one of these three variables can be eliminated from a formula for the luminous flux.

A constant luminous flux is a curve on a luminous flux surface in a three-dimensional space defined by luminous flux, forward current, and forward voltage. This curve can be approximated with various degrees of precision depending on how many measured points are available. The $I_F=A*V_F+B$ formula provides the simplest degree of precision.

The formula can be applied in two ways. In a first way, as described above, the parameters A and B are calculated from the characteristics depicted in FIGS. 1-4. Then a measurement is performed at a temperature, and the forward current is adjusted for the desired luminous flux output. This sets one point of the constant luminous flux curve in the three-dimensional space, from which the forward current is adjusted so as to get the forward voltage that complies with the formula $I_F=A*V_F+B$. While this procedure is good for many applications, the procedure relies on the ante-calculated formula, which is derived from rather approximate characteristics.

If a better precision is desired, then the calibration can be done at two different temperatures. The temperatures need not be known. The temperatures, however, should be as further apart as possible so as to cover the operating temperature range. The forward current is modified until the luminous output flux is at the desired value. The result of this adjustment is materialized in two relationships of the form $I_{F'}=A*V_{F1}+B$ and $I_{F2}=A*V_{F2}+B$. From these equations, the coefficients A and B can be deduced, and compensation with better precision can be performed.

Following the same principle, an even more accurate compensation can be devised by measuring more points of the constant luminous flux locus. For example, if three points measured, then a polynomial approximation or a linear interpolation scheme can be used. The linear interpolation scheme includes dividing an operating range into two or more linear ranges. The polynomial interpolation could use the formula: $I_F=A*V_F^2+B*V_F+C$. This approximation can yield an even better compensation.

Further, one can imagine many interpolation procedures requiring a corresponding number of determinations. In some implementations, multiple linear or multiple polynomial or a combination of logarithmic or exponential curves may be used. These procedures may not be economical for large-scale manufacturing. These procedures, however, can be crucial for special applications.

Figure 6:
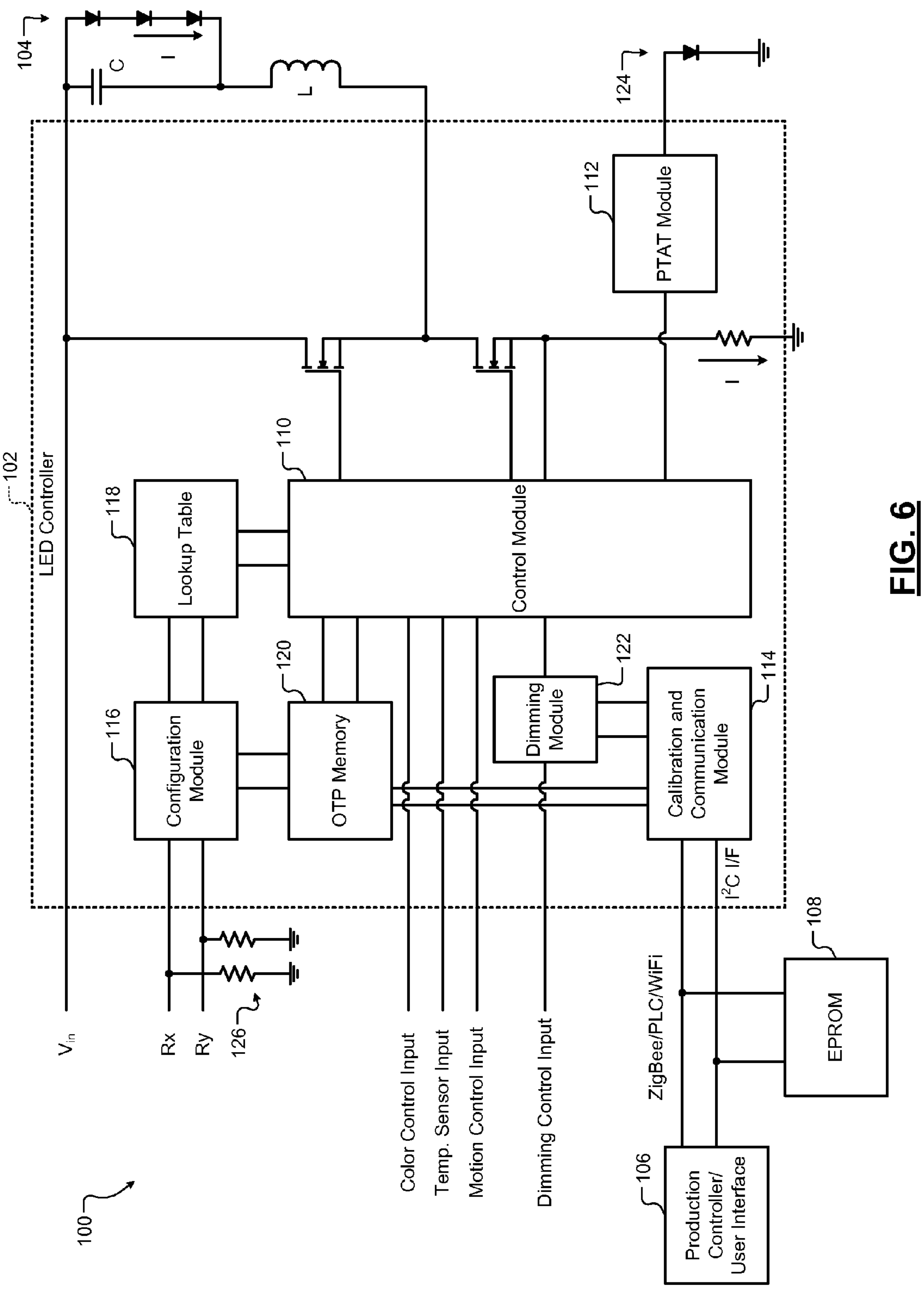
FIGS. 6-8 depict functional block diagrams of systems for compensating variations in luminosity of LEDs due to die-to-die variation and temperature drift.

Referring now to FIG. 6, a system 100 for determining changes in junction temperature of LEDs and compensating for drift in luminosity due to the changes is shown. As explained below, the system 100 performs calibration using an inter-integrated circuit (12C) interface or other suitable interface. The system 100 measures the temperature of the LED assembly using a proportional to absolute temperature (PTAT) module and an inexpensive silicon diode placed adjacent (proximate) to the LEDs in the luminaire.

The system 100 includes an LED controller 102, an LED string 104, and a production controller/user interface 106. Although only one LED string 104 is shown, the LED controller 102 can control multiple LED strings. A luminaire may include all of the components of the system 100 shown in FIG. 6 except the production controller/user interface 106. The LED controller 102 may be implemented by an integrated circuit.

The production controller/user interface 106, although shown as a single unit for simplicity, includes two separate units. Accordingly, depending on context, the production controller/user interface 106 is referred to as the production controller 106 or the user interface 106. The user interface 106 may communicate with the LED controller 102 via a ZigBee interface, a programmable logic controller (PLC), or a WiFi interface.

Depending on application, control inputs may be provided to the LED controller 102 to control various features of the LEDs. The control inputs may include a color control input, a temperature sensor input, a motion control input, and a dimming control input.

Additionally, in applications demanding precise control of luminosity, the system 100 may include a nonvolatile memory (e.g., an EPROM) 108 that can store voluminous calibration data. The EPROM 108 may be located external to the LED controller 102.

The LED controller 102 includes a control module 110, a proportional to absolute temperature (PTAT) module 112, a calibration and communication module 114, a configuration module 116, a lookup table 118, a nonvolatile memory (e.g., one-time programmable (OTP) memory) 120, and a dimming module 122. The OTP memory 120 is shown for example only. Any other suitable non-volatile memory may be used instead. The LED controller 102 performs two operations: calibration and compensation. The compensation operation is described first, followed by the calibration operation.

The control module 110 uses pulse width modulation (PWM) to drive the LEDs in the LED string 104. A buck type switched mode power supply (SMPS) including an inductance L and a capacitance C drives a predetermined current I through the LED string 104 according to PWM pulses generated by the control module 110. The control module 110 adjusts the predetermined current I (hereinafter current I) based on the temperature of the LEDs in the LED string 104. The temperature of the LEDs is determined as follows.

An inexpensive device (e.g., the silicon diode 124 shown) is placed in thermal proximity of (e.g., adjacent to) the LEDs in the LED string 104. The temperature characteristics of the silicon diode 124 may be similar to the temperature characteristics of the LEDs in the LED string 104. The silicon diode 124, however, need not have similar temperature characteristics as the LEDs in the LED string 104. The PTAT module 112 measures the temperature of the silicon diode 124 by evaluating a forward voltage drop differential of the silicon diode 124 at two different forward currents, whose ratio is known. This procedure used by the PTAT module 112 to measure the temperature of the silicon diode 124 is called a PTAT procedure.

The LED controller 102 generates calibration data and stores the calibration data in the OTP memory 120, the EPROM 108, or a suitable nonvolatile memory as described below. The control module 110 determines a correction value to correct the current I based on the calibration data and the temperature of the LEDs determined based on the voltage across the silicon diode 124. The control module 110 adjusts the current I using the correction value. Thus, the control module 110 compensates variations in luminosity of the LEDs due to changes in temperature of the LEDs.

The LED controller 102 generates the calibration data as follows. The calibration and communication module 114 communicates with the production controller 106. The production controller 106 determines the ambient temperature of the luminaire. The calibration is performed for a predetermined luminosity (i.e., desired luminosity) of the luminaire as follows.

The production controller 106 measures the light output of the LEDs in the LED string 104 using suitable sensors (not shown). The production controller 106 communicates the measured luminosity of the LEDs to the calibration and communication module 114. Based on the measured luminosity, the control module 110 adjusts the current I until the luminosity of the LEDs is equal to the predetermined luminosity (i.e., the desired luminosity).

The calibration and communication module 114 stores the values of the ambient temperature, the current I, and the luminosity of the LEDs in the OTP memory 120 (or other suitable nonvolatile memory). These values are the calibration data for the LEDs of the LED string 104 at the ambient temperature. Additional calibration data for a plurality of temperatures may be generated by placing the luminaire in environments having different temperatures during calibration. For example, the luminaire may be placed in an oven, a freezer, and so on during calibration.

During normal operation, the control module 110 determines the temperature of the LEDs by measuring the voltage across the silicon diode 124 as explained above. The control module 110 reads the calibration data stored in the OTP memory 120, for example. The control module 110 reads the template (e.g., temperature characteristics shown in FIG. 4) of the LEDs, which is stored in the lookup table 118.

Based on this information, the control module 110 determines the amount by which to adjust the current I to maintain the light output of the LEDs at the predetermined luminosity. The control module 110 adjusts the current I and maintains the light output of the LEDs at the predetermined luminosity.

The control module 110 adjusts the current I by adjusting the duty cycle of the PWM pulses while keeping the switching frequency of the SMPS unchanged. Alternatively, the control module 110 adjusts the current I by adjusting the switching frequency of the SMPS while keeping the duty cycle of the PWM pulses unchanged. In some implementations, both the duty cycle of the PWM pulses and the switching frequency of the SMPS may be adjusted.

In the present disclosure, the control module 110 determines a difference between a default current and a desired current of the LEDs that allows the luminaire to output the desired or reference luminosity. The parameters that define the desired current are stored in the LUTs and are used to drive the LEDs during normal operation.

Referring again to FIG. 4, depending on the family (e.g., the technology and/or the manufacturer) of the LEDs used, the slope of the temperature characteristics may differ. Accordingly, knowing only the predetermined luminosity of the luminaire as a reference is insufficient for compensation. In addition to the predetermined luminosity, a template (e.g., temperature characteristics shown in FIG. 4) of the LED family used in the luminaire should be known.

Templates for different LED families can be stored in the lookup table 118. Resistors 126 are used to select a template that matches the LED family used in the luminaire from the lookup table 118. The resistors 126 have values that correspond to a location where the template is stored in the lookup table 118. Based on the values of the resistors 126, the configuration module 116 selects an entry in the lookup table 118 where the template for the LEDs is stored.

Alternatively, in some instances, based on the values of the resistors 126, the configuration module 116 may select characteristic data of the LEDs stored in the OTP memory 120. For example, the characteristic data may be stored in the OTP memory 120 (or other suitable nonvolatile memory) when the LEDs have unique temperature characteristics or when the LEDs are manufactured using a new technology.

In some applications (e.g., medical applications), the luminosity control may have to be extremely precise. In such cases, the calibration data may be voluminous and may be stored in a nonvolatile memory (e.g., EPROM 108) external to the LED controller 102. Based on the values of the resistors 126, the configuration module 116 may select the calibration data stored in the EPROM 108. Since the configuration module 116 can select one or more of the lookup table 118, the OTP memory 120, and the EPROM 108, the configuration module 116 may also be called a selection module 116.

During normal operation, the user interface 106 can communicate with the LED controller 102 via the calibration and communication module 114. For example, the user interface 106 can be used to alter (e.g., fine tune) the calibration data. Additionally, the user interface 106 can be used to provide dimming inputs, and so on. The dimming module 122 generates duty cycle information based on an analog dimming input or inputs received from the user interface 106. The control module 110 generates PWM pulses according to the duty cycle to drive the LEDs.

Referring again to FIG. 3, the forward voltage VF of the LEDs is a function of the junction temperature. The junction temperature of the LEDs can be derived by measuring the forward voltage of the LEDs. Accordingly, the silicon diode 124 and the PTAT module 112 used to measure the voltage across the silicon diode 124 may be eliminated.

Figure 7:
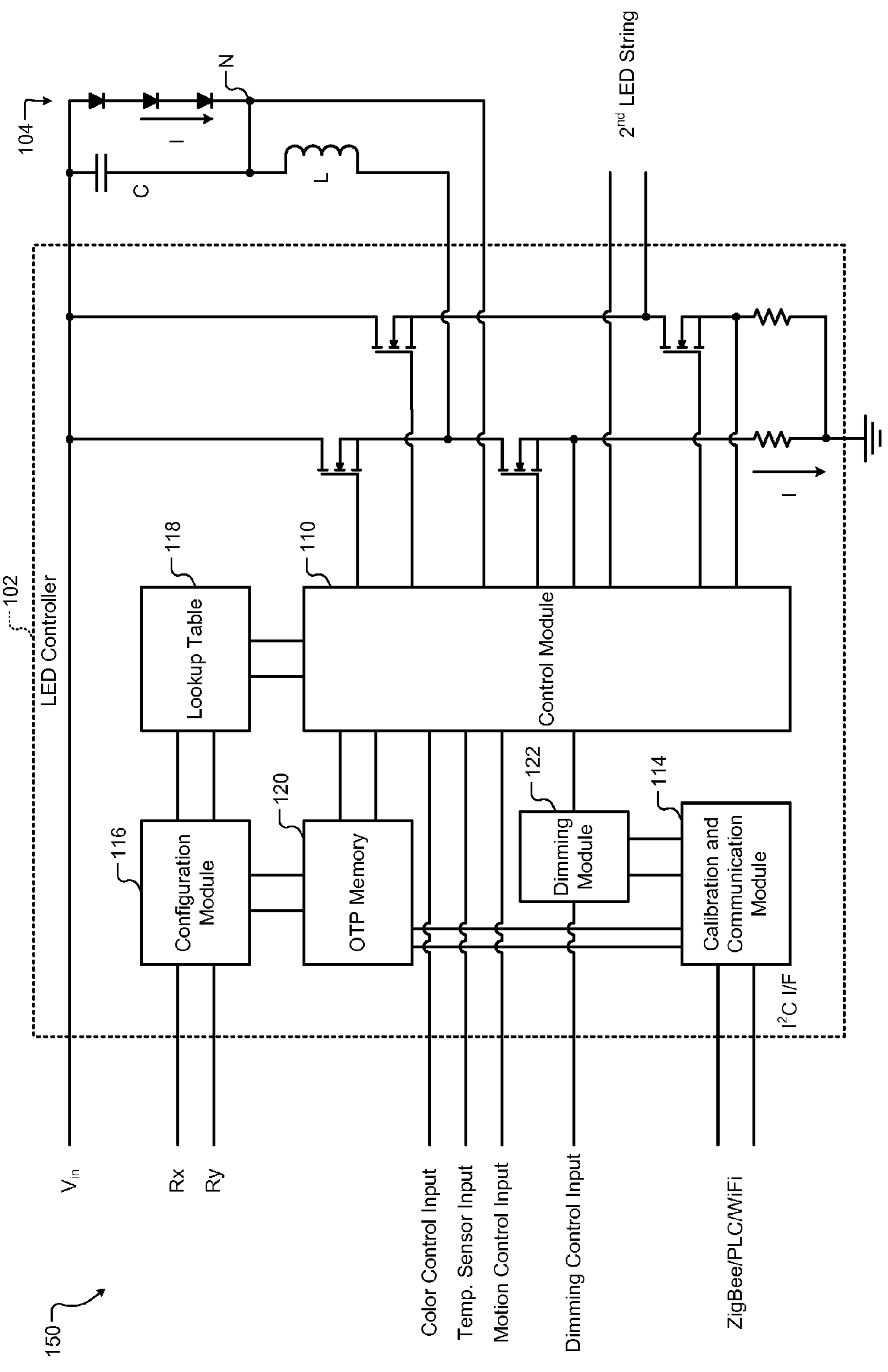

Referring now to FIG. 7, a system 150 for determining changes in junction temperature of LEDs and compensating for drift in luminosity due to the changes is shown. Although not shown, the system 150 includes all of the components of the system 100 except the PTAT module 112 and the silicon diode 124. Accordingly, operations identical to system 100 are not described again.

The control module 110 measures the forward voltage of the LEDs based on a difference between input voltage Vin and voltage at node N. Specifically, the control module 110 measures a voltage drop across the LED string 104. The control module 110 determines the forward voltage of an LED in the LED string 104 based on the voltage drop and a number of LEDs in the LED string 104.

Based on the forward voltage, the control module 110 determines the junction temperature of the LEDs using the template of the LEDs stored in the lookup table 118. Based on the junction temperature and the calibration data, the control module 110 determines the amount by which to adjust the current I to maintain the luminosity of the LEDs at the predetermined luminosity. The control module 110 adjusts the current I to maintain the luminosity of the LEDs at the predetermined luminosity.

As described in the overview above, the systems 100 and 150 can perform calibration at temperatures other than 25° C. For example, the calibration procedure described above can be repeated at 0° C. and 80° C. by placing the luminaire in different temperature environments.

Subsequently, during normal operation, when the systems 100 and 150 determine the temperature of the LEDs as described above, the temperature range may be between 0° C. and 85° C. The control module 110 can use interpolation to adjust the current I more precisely than when calibration is performed only at one temperature (e.g., at 25° C.). Further, the systems 100 and 150 can perform calibration and compensation on additional LED strings in the same manner as described above for the LED string 104.

Figure 8:
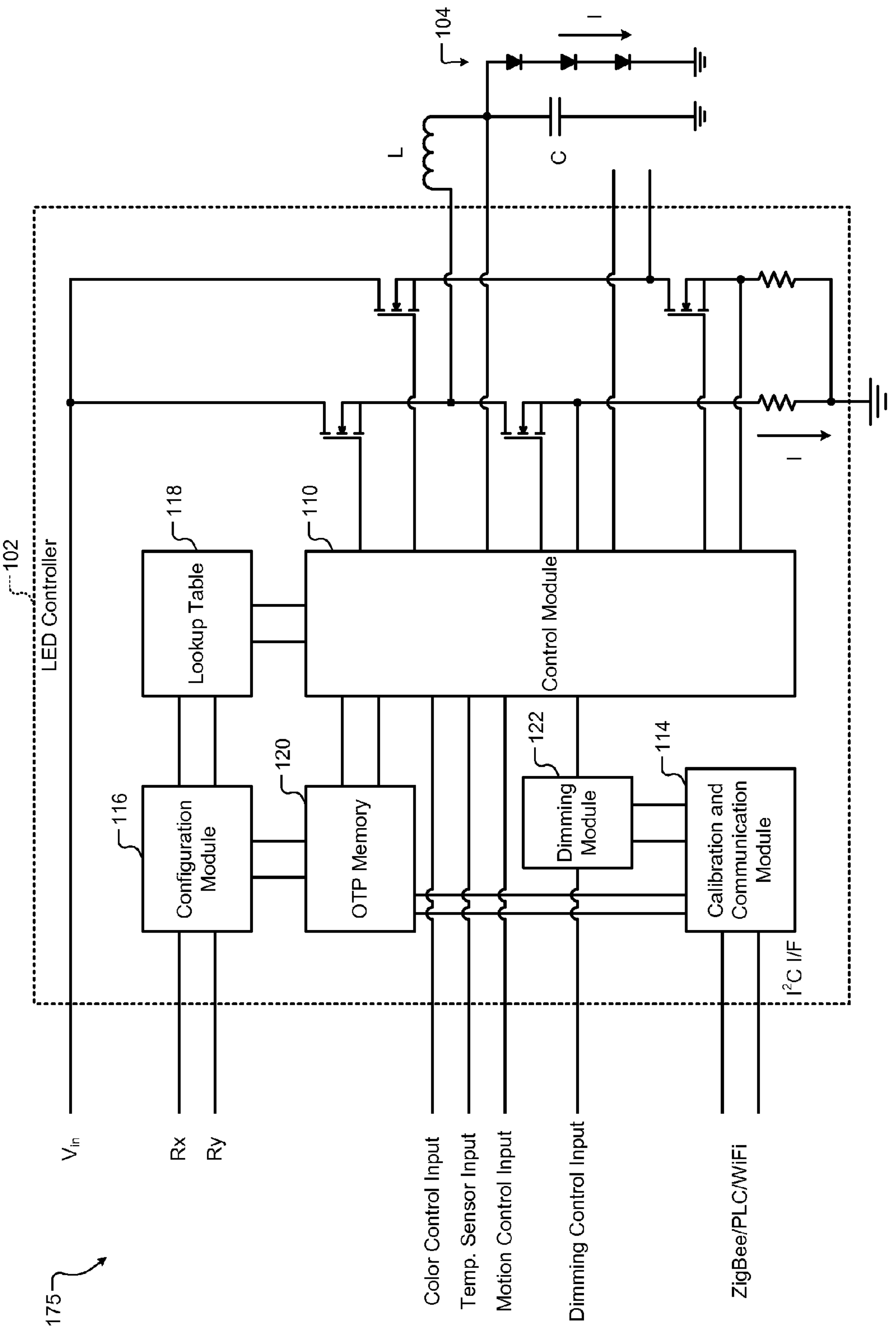

Referring now to FIG. 8, a system 175, which is a different implementation of the system 150, is shown. In the system 175, the LED strings are connected to the LED controller 102 differently than in the system 150. For example, the LED string 104 is connected to the control module 110 and ground as shown. Additional LED strings (not shown) may also be connected to the control module 110 and ground in the same manner. Other operations of the system 175 are identical to the operations of the system 150 are not described again.

Figure 9:
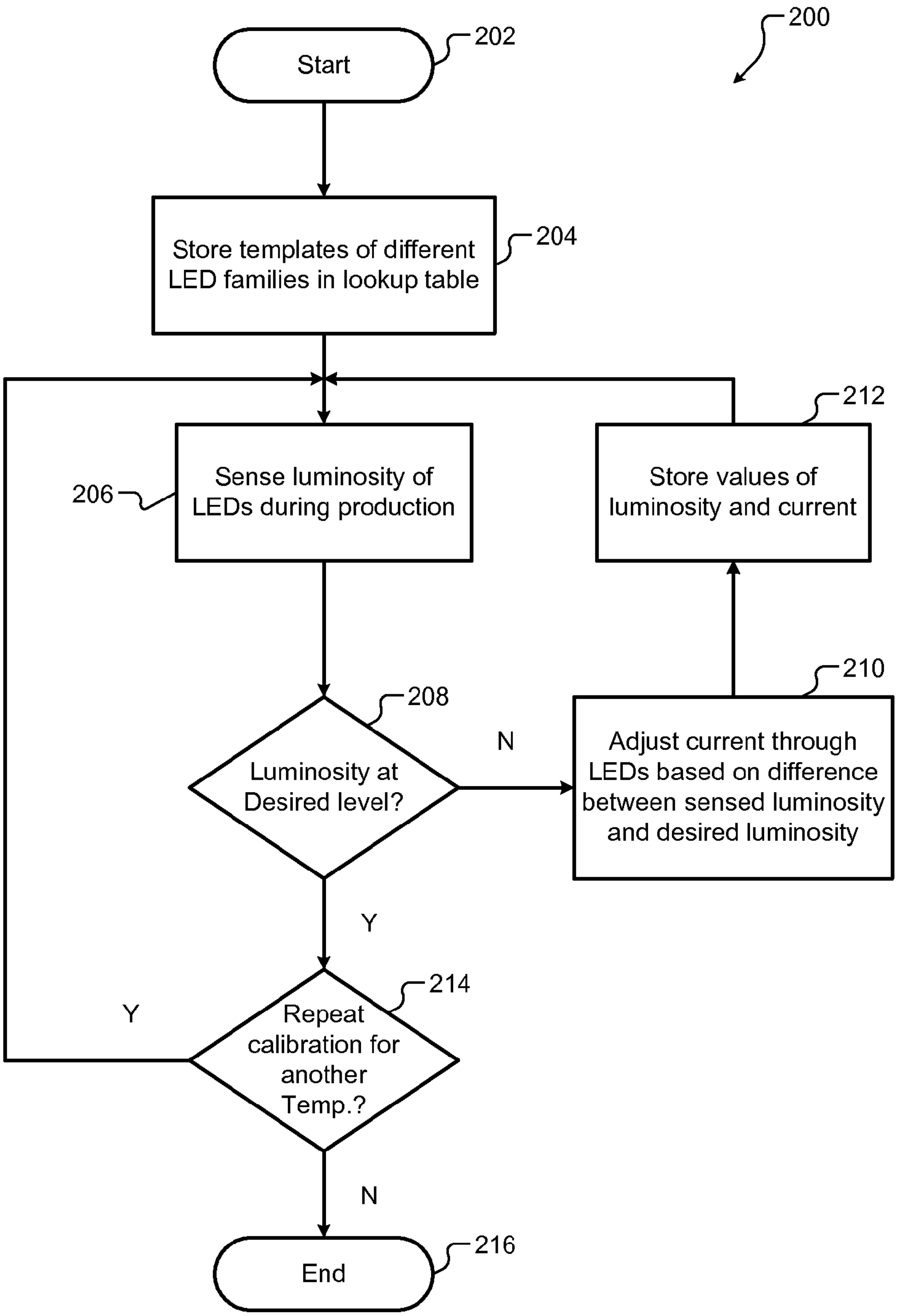
FIG. 9 is a flowchart of a method for generating calibration data used to compensate variations in luminosity of LEDs due to die-to-die variation and temperature d rift.

Referring now to FIG. 9, a method 200 for calibration according to the present disclosure is shown. Control begins at 202. At 204, control stores templates of different LED families in a lookup table. At 206, control senses luminosity of LEDs during production of a luminaire. At 208, control determines whether the luminosity of the LEDs is at a desired level at a current temperature.

At 210, if the luminosity is not at the desired level, control adjusts the current through the LEDs based on a difference between the sensed luminosity and the desired luminosity. At 212, control stores the values of the current and luminosity as calibration data for the current temperature, and control returns to 206.

When the luminosity is at the desired level, control determines at 214 whether to repeat calibration for another temperature. Control returns to 206 if calibration is to be repeated for another temperature. Otherwise control ends at 216.

Figure 10:
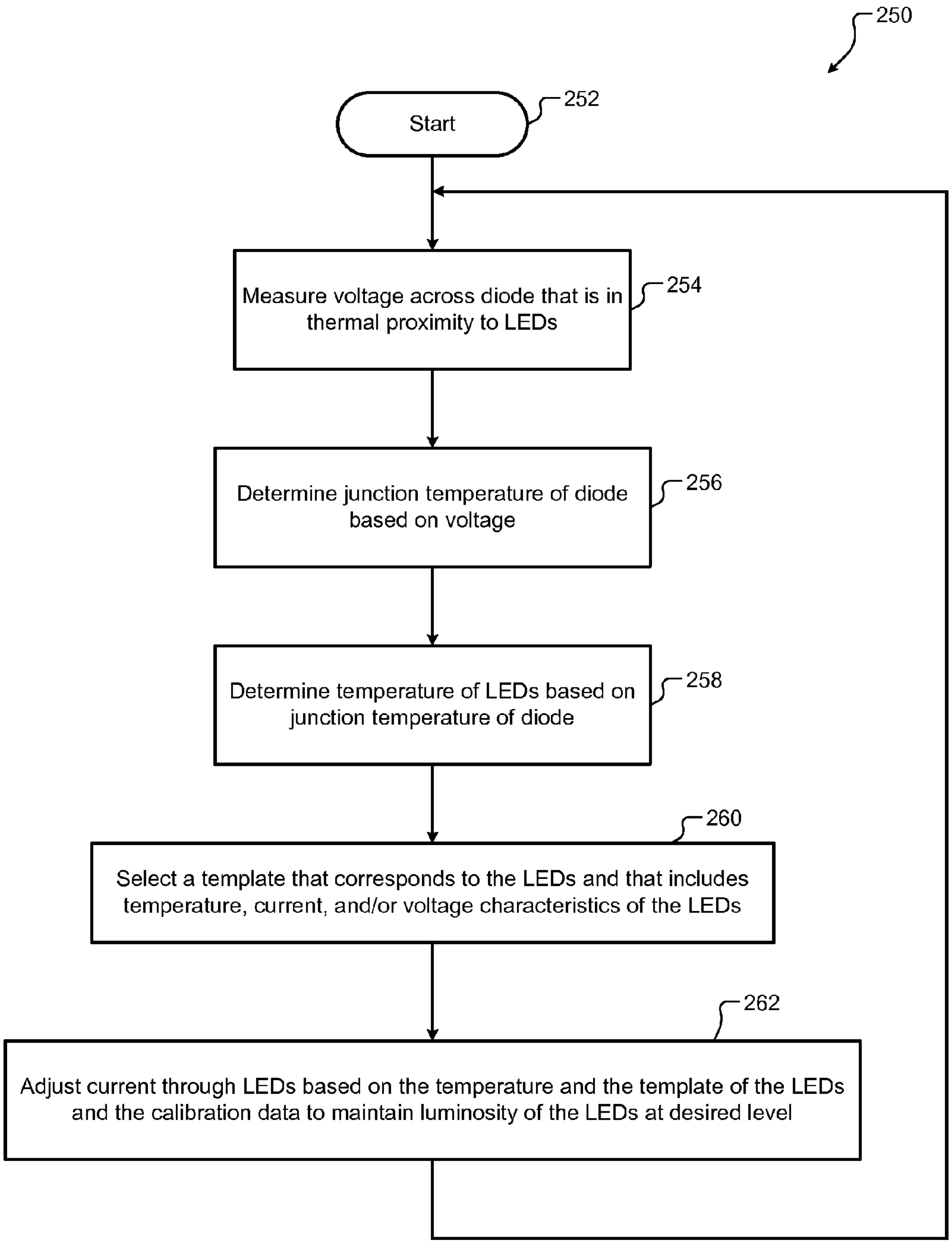
FIGS. 10 and 11 depict flowcharts of methods for compensating variations in luminosity of LEDs due to die-to-die variation and temperature drift.

Referring now to FIG. 10, a method 250 for compensating current through the LEDs using the calibration data is shown. Control begins at 252. At 254, control measures voltage across a diode (e.g., a silicon diode) that is in thermal proximity of the LEDs. At 256, control determines a junction temperature of the diode using the PTAT procedure.

At 258, control determines the temperature of the LEDs based on the junction temperature of the diode. At 260, control selects the template of the LEDs from the lookup table. The template includes temperature, current, and/or voltage characteristics of the LEDs. At 262, control adjusts the current through the LEDs based on the temperature and the template of the LEDs and the calibration data, and control returns to 254. Thus, control maintains the luminosity of the LEDs at the desired level.

Figure 11:
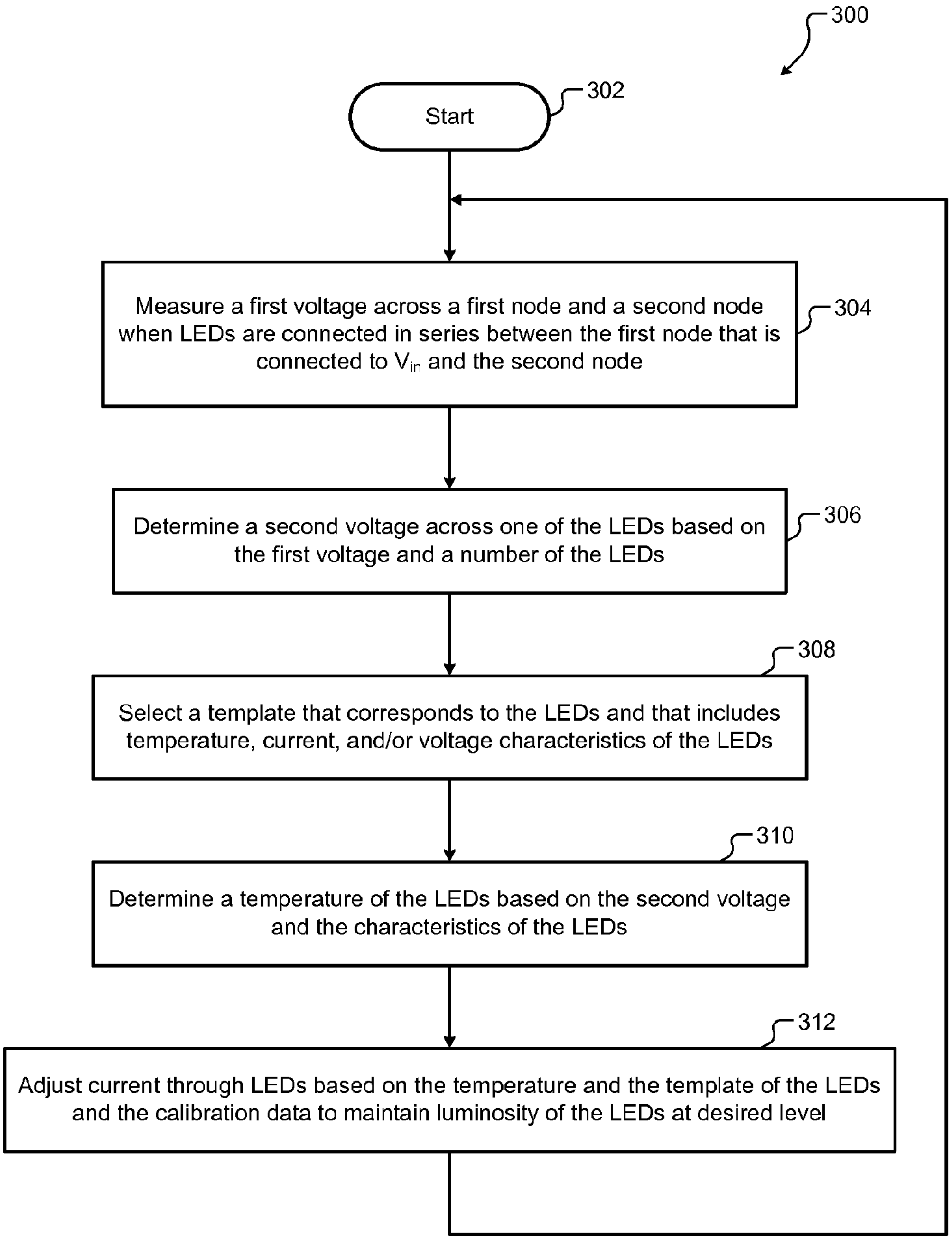

Referring now to FIG. 11, a method 300 for compensating current through the LEDs using the calibration data is shown. Control begins at 302. The LEDs are connected in series between a first node that is connected to the supply voltage Vin and a second node. At 304, control measures a first voltage across the first node and the second node. At 306, control determines a second voltage (i.e., forward voltage) across one of the LEDs based on the first voltage and the number of the LEDs.

At 308, control selects the template of the LEDs from the lookup table. The template includes temperature, current, and/or voltage characteristics of the LEDs. At 310, control determines the temperature of the LEDs based on the second voltage and the characteristics of the LEDs. At 312, control adjusts the current through the LEDs based on the temperature of the LEDs and the calibration data, and control returns to 304. Thus, control maintains the luminosity of the LEDs at the desired level.

Figure 12:
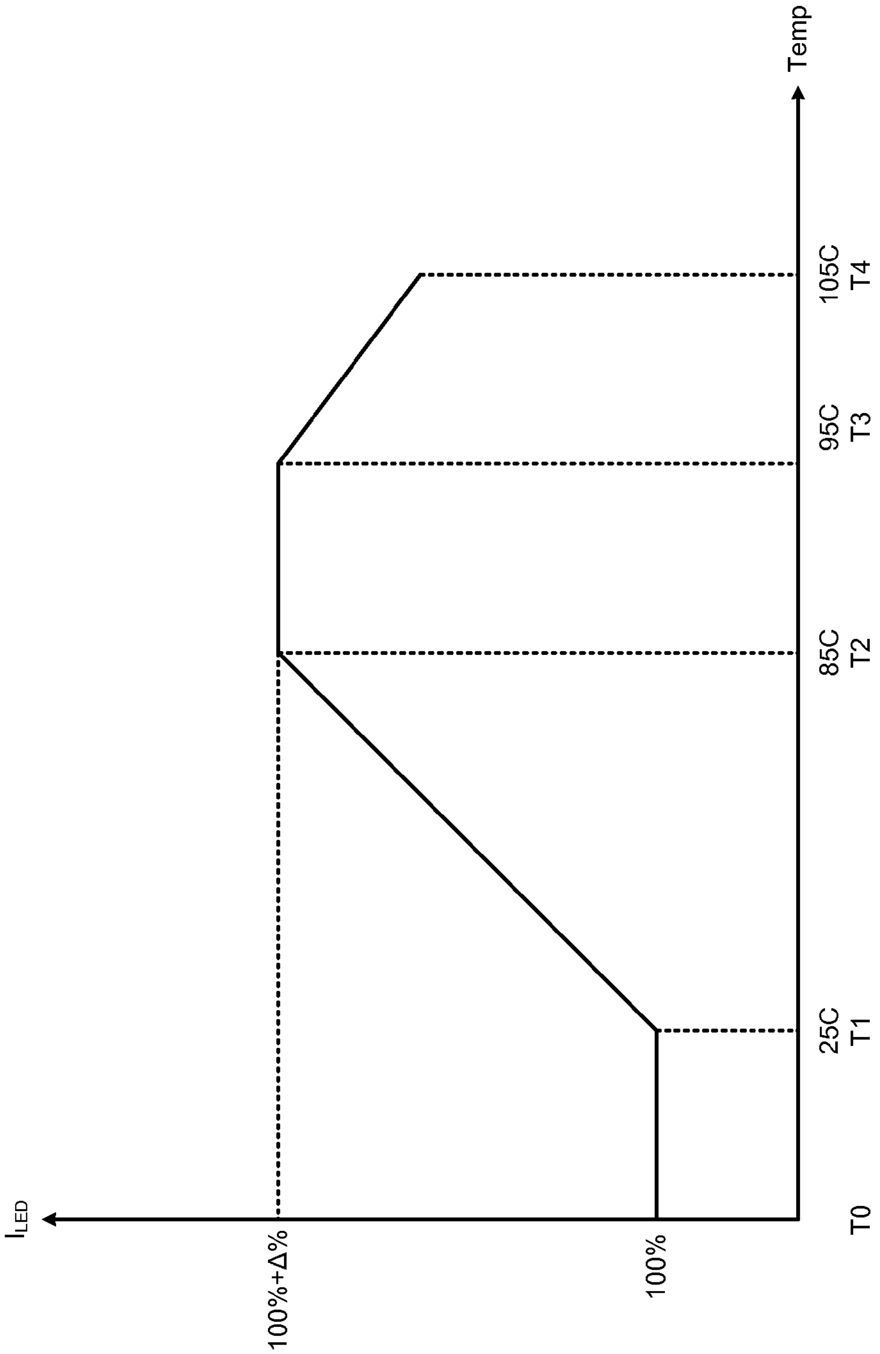
FIG. 12 shows an example of a temperature compensation curve.

Referring now to FIG. 12, the LED controller 102 shown in FIGS. 6-8 can perform temperature compensation using a small signal silicon diode as follows. The small signal silicon diode is placed in the luminaire where the temperature is to be measured. The small signal silicon diode is forward biased and connected to the temperature sensor input of the LED controller 102.

The LED controller 102 performs temperature compensation according to a generic temperature compensation curve shown in FIG. 12, which is not drawn to scale. The temperature compensation curve indicates an amount by which current through an LED string is to be changed when temperature of the luminaire changes within a predetermined operating temperature range. For example, the amount may be expressed in terms of a percentage of a nominal current through the LED string. The nominal current is a current at which the LED string outputs a desired luminosity at a normal operating temperature of the luminaire.

The LED controller 102 performs the temperature compensation in the predetermined operating temperature range of the luminaire. The LED controller 102 does not perform the temperature compensation outside the predetermined operating temperature range. For example only, the predetermined operating temperature range is shown as between 25° C. and 105° C. The LED controller 102 can select other operating temperature ranges of the luminaire within which to perform temperature compensation instead.

If the temperature sensed by the silicon diode is above 125° C., for example, the LED controller 102 enters in an over-temperature shutdown mode and stops driving the LED string 104. Subsequently, if the temperature sensed by the silicon diode is below 105° C., for example, the LED controller 102 starts driving the LED string 104 again.

The LED controller 102 performs the temperature compensation by correcting the forward current through the LED string 104 using a linear interpolation function, for example. The function is a straight line defined by a starting point and a slope as shown in FIG. 12. For example, the reference starting point is at 25° C. as shown in FIG. 12.

The LED controller 102 may use a different slope and different vertex points instead. The different slopes and the different vertex points can be stored in memory (e.g., in the LUT 118 shown in FIGS. 6-8) and read from the memory by the LED controller 102. Further, the LED controller 102 can implement temperature compensation independently for two LED strings. That is, each LED string can have a corresponding compensation curve.

Referring again to FIGS. 6-8, the LED controller 102 can perform optical or color compensation as follows. The LED controller 102 uses an optical compensation procedure that includes a close loop operation using an internal reference voltage. An optical sensor senses the light output of the LED strings and generates a control signal that is fed back to the LED controller 102 via the color control input of the LED controller 102. The LED controller 102 compares the feedback received to the internal reference voltage and adjusts the currents through the two LED strings until the feedback received matches the internal reference voltage. Additionally, the LED controller 102 keeps a ratio of the currents through the two LED strings constant, thereby keeping both the light output and the color temperature of the luminaire constant (stable).

For example, suppose that the first LED string includes white LEDs, and the second LED string includes RED LEDs. Suppose further that the first LED string operates at 500 mA nominal current and that the second LED string operates at 100 mA nominal current. When the LED controller 102 uses a default color control mode, currents through both LED strings will change by the same relative ratio. For example, if the current through the first LED string changes by 20%, the current through the second LED string will also change by the same amount, that is 20%. For example, the current through the second LED string will become 120 mA, and the current through the first LED string current will become 600 mA.

In addition, the LED controller 102 can independently compensate light output of the LED strings by separately modifying the current through each of the LED strings. Either of the two LED strings can be selected as a primary LED string while the other LED string becomes a secondary LED string.

Moreover, a ratio of a variation of current through the secondary LED string to a variation of current through the primary LED string can be programmable. For example, if the ratio is selected as 60%, the secondary LED string current will change by approximately 60% of the variation of the current through the primary LED string. For example, if the current through the primary LED string is changed by 100 mA, the current through the secondary LED string will be changed by 60 mA.

In addition, a current range over which current compensation is performed can be divided into several sub-ranges. For each sub-range, a different ratio of current variation can be selected for varying currents through the two LED strings.

The procedure described above allows users to cover wide ranging applications and to accomplish many lighting control effects, including a natural light variation mimicking solar light. The optical compensation can be used either for correcting ageing of the luminaire or for achieving complex lighting effects.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:

a selection module configured to select one of a plurality of templates corresponding to a plurality of light emitting diodes, wherein the selected template includes one or more of temperature, current, and voltage characteristics of the plurality of light emitting diodes; and a control module configured to measure a voltage across one of the plurality of light emitting diodes;

determine a temperature of the plurality of light emitting diodes based on (i) the voltage measured across the one of the plurality of light emitting diodes and (ii) the selected template; and in order to maintain a luminosity of the plurality of light emitting diodes at a predetermined luminosity, adjust current through the plurality of light emitting diodes based on (i) the temperature, (ii) the selected template, and (iii) calibration data, wherein the calibration data include current through the plurality of light emitting diodes and corresponding luminosities of the plurality of light emitting diodes.

2. The system of claim 1, further comprising a calibration module configured to:

generate the calibration data at one or more predetermined temperatures, and store the calibration data in a nonvolatile memory.

3. The system of claim 1, wherein the plurality of templates is stored in a lookup table, and wherein each of the plurality of templates corresponds to a different type of light emitting diode.

4. The system of claim 3, wherein the selection module is configured to (i) communicate with a pair of resistances and (ii) select the selected template from the lookup table based on values of the resistances.

5. The system of claim 1, further comprising:

a switch mode power supply configured to supply power to the plurality of light emitting diodes, wherein the control module is configured to generate a control signal to drive the switch mode power supply, and adjust the current through the plurality of light emitting diodes by adjusting one or more of (i) a switching frequency of the control signal and (ii) a pulse width of the control signal.

6. A display system comprising:

the system of claim 1; and the plurality of light emitting diodes.

7. A system comprising:

a selection module configured to select one of a plurality of templates corresponding to a plurality of light emitting diodes, wherein the selected template includes one or more of temperature, current, and voltage characteristics of the plurality of light emitting diodes;

a diode in thermal proximity to the plurality of light emitting diodes; and a control module configured to determine a temperature of the plurality of light emitting diodes based on a junction temperature of the diode, and in order to maintain a luminosity of the plurality of light emitting diodes at a predetermined luminosity, adjust current through the plurality of light emitting diodes based on (i) the temperature, (ii) the selected template, and (iii) calibration data, wherein the calibration data include current through the plurality of light emitting diodes and corresponding luminosities of the plurality of light emitting diodes.

8. The system of claim 7, further comprising a proportional to absolute temperature module configured to:

determine the junction temperature of the diode using a proportional to absolute temperature procedure, wherein the proportional to absolute temperature procedure includes determining a difference in forward voltage drop across the diode at two different forward currents having a known ratio.

9. The system of claim 7, further comprising a calibration module configured to:

generate the calibration data at one or more predetermined temperatures, and store the calibration data in a nonvolatile memory.

10. The system of claim 7, wherein the plurality of templates is stored in a lookup table, and wherein each of the plurality of templates corresponds to a different type of light emitting diode.

11. The system of claim 10, wherein the selection module is configured to (i) communicate with a pair of resistances and (ii) select the selected template from the lookup table based on values of the resistances.

12. The system of claim 7, further comprising:

a switch mode power supply configured to supply power to the plurality of light emitting diodes, wherein the control module is configured to generate a control signal to drive the switch mode power supply, and adjust the current through the plurality of light emitting diodes by adjusting one or more of (i) a switching frequency of the control signal and (ii) a pulse width of the control signal.

13. A display system comprising:

the system of claim 7; and the plurality of light emitting diodes.

14. A system comprising:

a selection module configured to select one of a plurality of templates corresponding to a plurality of light emitting diodes connected in series, wherein the selected template includes one or more of temperature, current, and voltage characteristics of the plurality of light emitting diodes; and a control module configured to determine a temperature of the plurality of light emitting diodes based on (i) a first voltage across the plurality of light emitting diodes, (ii) a second voltage across one of the plurality of light emitting diodes, and (iii) the selected template, and in order to maintain a luminosity of the plurality of light emitting diodes at a predetermined luminosity, adjust current through the plurality of light emitting diodes based on (i) the temperature, (ii) the selected template, and (iii) calibration data, wherein the calibration data include current through the plurality of light emitting diodes and corresponding luminosities of the plurality of light emitting diodes.

15. The system of claim 14, wherein:

the light emitting diodes in the plurality of light emitting diodes are connected in series between (i) a first node communicating with a supply voltage and (ii) a second node; and the control module is configured to measure the first voltage across the first node and the second node, and determine the second voltage across one of the plurality of light emitting diodes based on the first voltage and a number of the plurality of light emitting diodes.

16. The system of claim 14, further comprising a calibration module configured to:

generate the calibration data at one or more predetermined temperatures, and store the calibration data in a nonvolatile memory.

17. The system of claim 14, wherein the plurality of templates is stored in a lookup table, and wherein each of the plurality of templates corresponds to a different type of light emitting diode.

18. The system of claim 17, wherein the selection module is configured to (i) communicate with a pair of resistances and (ii) select the selected template from the lookup table based on values of the resistances.

19. The system of claim 14, further comprising:

a switch mode power supply configured to supply power to the plurality of light emitting diodes, wherein the control module is configured to generate a control signal to drive the switch mode power supply, and adjust the current through the plurality of light emitting diodes by adjusting one or more of (i) a switching frequency of the control signal and (ii) a pulse width of the control signal.

20. A display system comprising:

the system of claim 14; and the plurality of light emitting diodes.

* * * * *